(12) United States Patent
Varda et al.

(10) Patent No.: US 11,861,420 B2
(45) Date of Patent: *Jan. 2, 2024

(54) CONCURRENCY CONTROL IN AN ASYNCHRONOUS EVENT-LOOP BASED PROGRAM ENVIRONMENT

(71) Applicant: CLOUDFLARE, INC., San Francisco, CA (US)

(72) Inventors: Kenton Taylor Varda, Austin, TX (US); Alex Dwane Robinson, Austin, TX (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/734,933

(22) Filed: May 2, 2022

(65) Prior Publication Data
US 2023/0039929 A1 Feb. 9, 2023

Related U.S. Application Data

(63) Continuation of application No. 17/370,663, filed on Jul. 8, 2021, now Pat. No. 11,321,152.

(51) Int. Cl.
*G06F 9/54* (2006.01)
*G06F 3/06* (2006.01)
*G06Q 10/101* (2023.01)

(52) U.S. Cl.
CPC ........... *G06F 9/542* (2013.01); *G06F 3/0604* (2013.01); *G06F 3/0659* (2013.01); *G06F 3/0673* (2013.01); *G06F 9/546* (2013.01); *G06F 2209/548* (2013.01); *G06Q 10/101* (2013.01)

(58) Field of Classification Search
None
See application file for complete search history.

(56) References Cited

U.S. PATENT DOCUMENTS

| | | |
|---|---|---|
| 8,589,603 B2 | 11/2013 | Craddock et al. |
| 8,631,188 B1 | 1/2014 | Heath et al. |
| 10,498,812 B1 | 12/2019 | Varda et al. |
| 10,572,510 B2 | 2/2020 | Lee et al. |

OTHER PUBLICATIONS

Non-Final Office Action, U.S. Appl. No. 17/370,663, dated Nov. 17, 2021, 19 pages.
Notice of Allowance, U.S. Appl. No. 17/370,663, dated Jan. 21, 2022, 9 pages.
Varda, Workers Durable Objects Beta: A New Approach to Stateful Serverless, Cloudflare, Sep. 28, 2020, 16 pages, downloaded at: https://blog.cloudflare.com/introducing-workers-durable-objects/.

*Primary Examiner* — Syed A Roni
(74) *Attorney, Agent, or Firm* — NICHOLSON DE VOS WEBSTER & ELLIOTT LLP

(57) ABSTRACT

Concurrency control in an asynchronous event-loop based program environment is described. A program is implemented with an asynchronous event-loop. A piece of code controls events into the program by preventing events from being delivered to the program while a storage operation is executing except for storage completion events. Those events are prevented from being delivered to the program until the storage operation completes and the program is not executing code.

20 Claims, 8 Drawing Sheets

| Request 1 | Request 2 |
|---|---|
| (T1) async function getUniqueNumber() { | (T1) |
| (T2) let val = await this.storage.get("counter"); | (T2) |
| (T3) | (T3) async function getUniqueNumber() { |
| (T4) | (T4) let val = await this.storage.get("counter"); |
| (T5) await this.storage.put("counter", val + 1); | (T5) |
| (T6) | (T6) await this.storage.put("counter", val + 1); |
| (T7) return val; | (T7) |
| (T8) } | (T8) |
| (T9) | (T9) return val; |
| (T10) | (T10) } |
| (T11) | (T11) |
| (T12) | (T12) |

FIG. 3

| Request 1 | Request 2 |
|---|---|
| (T1) async function getUniqueNumber() { | (T1) |
| (T2)    let val = await this.storage.get("counter"); | (T2) |
| (T3) | (T3) //Request 2 received; delivery is blocked |
|  |       //because request 1 is waiting for storage. |
| (T4) | (T4) |
| (T5)    await this.storage.put("counter", val + 1); | (T5) |
| (T6) | (T6) //Request 2 delivery is blocked because |
|  |       //request 1 is waiting for storage. |
| (T7)    return val; | (T7) |
| (T8) } | (T8) |
| (T9) | (T9) async function getUniqueNumber() { |
| (T10) | (T10)    let val = await this.storage.get("counter"); |
| (T11) | (T11) |
| (T12) | (T12) |
| (T13) | (T13)    await this.storage.put("counter", val + 1); |
| (T14) | (T14) |
| (T15) | (T15)    return val; |

FIG. 4

CONCURRENCY CONTROL IN AN ASYNCHRONOUS EVENT-LOOP BASED PROGRAM ENVIRONMENT

CROSS-REFERENCE TO RELATED APPLICATIONS

This application is a continuation of U.S. application Ser. No. 17/370,663, filed Jul. 8, 2021, now issued as U.S. Pat. No. 11,321,152 which is hereby incorporated by reference.

FIELD

Embodiments of the invention relate to the field of computing; and more specifically, to concurrency control in an asynchronous event-loop based program environment.

BACKGROUND

There are several different ways to store data. A common approach is to use a monolithic database model that is fundamentally centralized. These databases are sometimes claimed to be distributed, but they either are based on a global synchronization procedure (e.g., consistent and partition tolerant) or eventual consistency through merging changes (e.g., highly available and partition tolerant). Global synchronization can be slow especially as the distributed database and the number of nodes grows. Eventual consistency is difficult to do correctly and is error prone. Write operations are confirmed as successful once they are fully durable (e.g., the data is successfully stored on disk). Depending on the architecture of the database, confirming the write was successful may be relatively slow. However, a write operation that is confirmed before the write operation is fully complete (and potentially synchronized depending on the architecture) is undesirable as there is a possibility that the write operation may fail, the disk may fail, or otherwise the data could be lost. If the write does not complete successfully, the user should be presented with an error message.

A race condition occurs when two operations running concurrently interfere with each other in a way that makes them behave incorrectly. Race conditions are commonly associated with code that uses multiple threads. Race conditions can occur, however, with single threaded programs. For instance, JavaScript code is executed in a single thread that uses event-driven programming with callbacks. Although it is not possible for two pieces of JavaScript code to be running "at the same time" in the same isolate, it is possible that events executing on behalf of different logical requests could be interleaved or otherwise happen in an order that the developer did not anticipate.

SUMMARY

Concurrency control in an asynchronous event-loop based program environment is described. A program is implemented with an asynchronous event-loop. A first piece of code controls events into the program by preventing events from being delivered to the program while a storage operation is executing except for storage completion events. Those events are prevented from being delivered to the program until the storage operation completes and the program is not executing code. A second piece of code controls outgoing messages from the program by preventing outgoing messages from being transmitted when a storage write operation is in progress except for outgoing messages that are storage write operations. Upon the successful completion of the storage write operation, the outgoing messages that were prevented from being transmitted are transmitted.

BRIEF DESCRIPTION OF THE DRAWINGS

The invention may best be understood by referring to the following description and accompanying drawings that are used to illustrate embodiments of the invention. In the drawings:

FIG. 3 illustrates a race condition that can be prevented with the input gate of an embodiment.

FIG. 4 illustrates the race condition that is prevented with the input gate of an embodiment.

DESCRIPTION OF EMBODIMENTS

Figure 1:
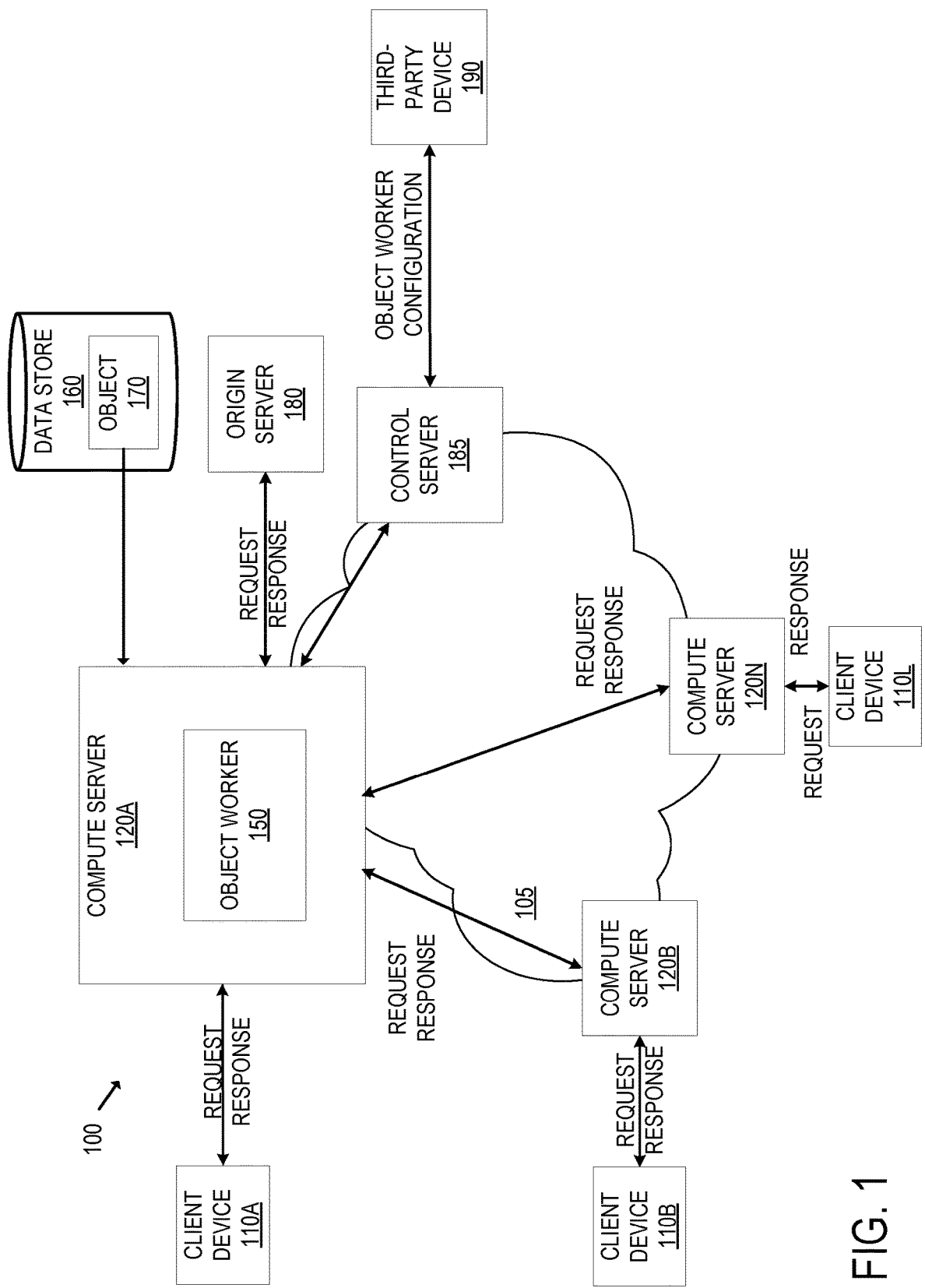
FIG. 1 illustrates an exemplary embodiment of a cloud computing platform that executes a system for concurrency control in an asynchronous event-loop based program environment in a distributed cloud computing network.

A method and apparatus for concurrency control in an asynchronous event-loop based program environment is described. The flow of events into a program implemented with an asynchronous event-loop is controlled, and/or the flow of outgoing messages from the program are controlled. For example, the program may be a piece of JavaScript and may be implemented in an isolated execution environment such as an isolate of the V8 JavaScript engine. When the program is executing a storage operation, no events are delivered to the program except for storage completion events. Any other event is deferred until the program is no longer executing code and the program is not waiting for a storage operation to complete. To control outgoing messages from the program, when a storage write operation is in progress, any new outgoing network messages are prevented from being sent until the write operation has completed (e.g., confirmed to be written to disk). If the write operation fails, the outgoing network messages are discarded and replaced with errors.

An input event may be an incoming request (e.g., an HTTP/S request), a response (e.g., an incoming HTTP/S response received from a previous outgoing request), an internal event such as a scheduled job, a timer event (e.g., a JavaScript timer event such as setTimeout( ) or setInterval( )), a cache API operation event, a key value store read/write event, a TCP I/O event, or other network event, a keyboard input event, a mouse input event, etc. For instance, consider a program that initiates a read operation from storage and an HTTP request to a remote server, and the HTTP response is received before the storage read completes. The HTTP response is prevented from being delivered to the object worker until the read result is delivered first. If the result of the read operation initiates another read operation, the HTTP response remains blocked until the second read completes, and so on. The HTTP response is delivered to the object worker only once that object worker has no storage operations (e.g., storage requests or storage writes) in-flight and it is not executing code in response to another storage operation event. Thus, the input event may be controlled so that an asynchronous storage operation can be performed without inadvertently allowing a concurrent operation on the single-threaded event loop to run in the meantime that may change the program state in unexpected ways.

Controlling outgoing messages allows the program to continue executing concurrently with a storage write without running the risk of data loss after confirmation (by preventing other parties from being falsely informed that the data was stored). To the program, it appears as if the write operation finishes relatively instantly even though the actual write operation may not be completed (or even complete) and the object worker can continue to execute code. However, outgoing network messages are prevented from being sent until the write operation is complete. Thus, the program can assume the storage write operation succeeded and continue executing the code. If the storage operation fails, then no outgoing message is delivered and an error message is in place. Thus, in the rare event that a write operation fails, a premature confirmation of a successful write operation is not received by remote parties. This means that although the write is assumed to be confirmed, no other entity will receive that confirmation until the write is confirmed. In the meantime, the program can execute other code concurrently that it would otherwise have had to wait to run for the confirmation that the storage write completed.

In an embodiment, an in-memory caching layer is used. The in-memory caching layer may cache data directly in memory in the process where the program runs. When a read operation requests a key that is in the cache, the operation returns the value from the cache. The value may be returned without context-switching out of the thread and isolate where the program is hosted. If the key is not in the cache, then a storage request is needed. A storage operation writes to the in-memory caching layer. The output control described herein prevents the premature confirmation of writes to any external entity. Write operations may be coalesced (even if they are 'await'ed) such that the output control waits only for O(1) network round trips of latency, not O(n).

In an embodiment, the code may be written to bypass the controlling of the events with specific syntax that indicates that the controlling of events will not occur.

In an embodiment, data of the program is separated into one or more units referred herein as objects, where a single object is owned by a single instantiation of a piece of code that can read and/or modify the object while the single piece of code is executing. Other entities that wish to read and/or modify the object communicate with the single instantiation of the piece of code that owns the object. As referred herein, an object worker includes a combination of the single instantiation of a piece of code and the object that belongs to the single instantiation of the piece of code. Each instance of an object worker has its own private and persistent data that the object worker can read and/or modify and which no other object worker can directly access. Thus, the single instantiation of the piece of code solely controls reading and/or writing access to the object in which it controls. The piece of code can be, for example, a piece of JavaScript or other interpreted language, a WebAssembly (WASM) compiled piece of code, or other compiled code. In an embodiment, the piece of code is written against standard Web Platform APIs such as the W3C standard ServiceWorker API for receiving HTTP requests. For purposes of this description, each piece of code is referred to as an object worker script, and each single instantiation of the piece of code is referred to as an instantiated object worker script. The object of an object worker may be persistently located in storage (e.g., object storage). An object worker locks the data such that it is the sole owner of the data while it is being executed. Other entities that wish to interact with the data send messages to the object worker that owns the data. The object worker may be a program based on a single-threaded event loop.

FIG. 1 illustrates an exemplary embodiment of a cloud computing platform that executes a system for concurrency control in an asynchronous event-loop based program environment in a distributed cloud computing network. The system 100 includes the client devices 110A-L, the compute servers 120A-N, the data store 160, the origin server 180, the control server 185, and the third-party device 190.

Each client device is a computing device (e.g., laptop, workstation, smartphone, mobile phone, tablet, gaming system, set top box, wearable device, Internet of Things (IoT) device, etc.) that can transmit and/or receive network traffic. Each client device may execute a client network application such as a web browser, native application, or other application that can access network resources (e.g., web pages, images, word processing documents, PDF files, movie files, music files, or other computer files).

The compute servers 120A-N are part of the distributed cloud computing network 105. The compute servers 120A-N are geographically distributed (e.g., in different locations throughout the world). There may be hundreds or more compute servers 120. Each compute server 120 may include one or more physical servers that are part of the same PoP. Although not illustrated in FIG. 1, the compute servers 120A-N may be part of PoPs that may include other physical servers (e.g., one or more compute servers, one or more control servers, one or more DNS servers (e.g., one or more authoritative name servers, one or more proxy DNS servers), and one or more other pieces of network equipment such as router(s), switch(es), and/or hub(s)). Each PoP (and each compute server) may be part of a different data center and/or colocation site. Although not illustrated in FIG. 1, there are other physical devices between the compute servers 120A-N such as routers, switches, etc.

Each compute server may execute a program implemented with an asynchronous event-loop. An example of such a program is the object worker 150. As described above, each object worker includes a combination of an instantiation of a piece of code and an object that belongs to the instantiation of the piece of code. Each instance of an object worker has its own private and persistent data that the object worker can read and/or modify and which no other object worker can directly access. The piece of code can be, for example, a piece of JavaScript or other interpreted language, a WebAssembly (WASM) compiled piece of code, or other compiled code. In an embodiment, the piece of code is written against standard Web Platform APIs such as compliant with the W3C standard ServiceWorker API for receiving HTTP requests. An object worker locks the data such that it is the sole owner of the data while it is being executed. Other entities that wish to interact with the data send messages to the object worker that owns the data. In an embodiment, each instantiated object worker script is run in an isolated execution environment, such as run in an isolate of the V8 JavaScript engine. For instance, in the example of FIG. 1, the object worker 150 may execute in an isolated execution environment, such as run in an isolate of the V8 JavaScript engine. The isolated execution environment can be run within a single process. In an embodiment, the instantiated object worker scripts are not executed using a virtual machine or a container. In an embodiment, a particular object worker script is loaded and executed on-demand (when and only if it is needed) at a particular compute server of the distributed cloud computing network.

The origin server 180, which may be owned or operated directly or indirectly by a customer of the cloud computing platform, is a computing device on which a network resource resides and/or originates (e.g., web pages, images, word processing documents, PDF files movie files, music files, or other computer files). In an embodiment, the origin server 180 is not required such that a compute server can respond to a request without querying an origin server.

The control server 185 is operated by the cloud computing platform and provides a set of tools and interfaces for a customer to, among other things, configure object workers to be run in the cloud computing platform. The third-party device 190 is a computing device (e.g., laptop, workstation, smartphone, mobile phone, tablet, etc.) that is used by third parties such as a customer, among other things, interact with the control server 185. For instance, the control server 185 may allow the customer to indicate how the data is to be split into one or more units.

The customer can split the data into units that tend to be accessed by the same client or sets of clients. This allows the object to naturally migrate to near where the client(s) are accessing the data thereby providing fast, low-latency access. The following are examples of how the data can be split. If the customer is providing a collaborative document editing system, each document of the system may be a separate object. If the customer is providing an online gaming service, each game session may be a separate object. For an online email service, each user's mailbox may be a separate object. For a calendar service, each user's calendar may be a separate object. For a team chat product, each channel may be a separate object.

The control server 185 may allow the customer to upload one or more object worker scripts and specify when the object worker script(s) are to be run. For instance, the customer may associate a rule that indicates when an object worker script is to be run. By way of example, the control server 185 may allow the customer to configure a URL matching pattern that indicates the URL(s) for which the object worker script is to run. The control server 185 may allow the customer to delete and update previously uploaded object worker script(s).

In an embodiment, the control server 185 deploys each object worker script to each of the compute servers 120A-N automatically (without the customer selecting which of the compute servers 120A-N in which to deploy the object worker script). In another embodiment, the control server 185 allows the customer to indicate which of the compute servers 120A-N are to be deployed to a particular worker script. The control server 185 creates an identifier for each unique object worker script. In an embodiment, the identifier is created by hashing the content of the object worker script (e.g., using a cryptographic hash function such as SHA-256), where two scripts with identical content will have the same identifier even if uploaded by different customers and even if applied to different zones.

Figure 2:
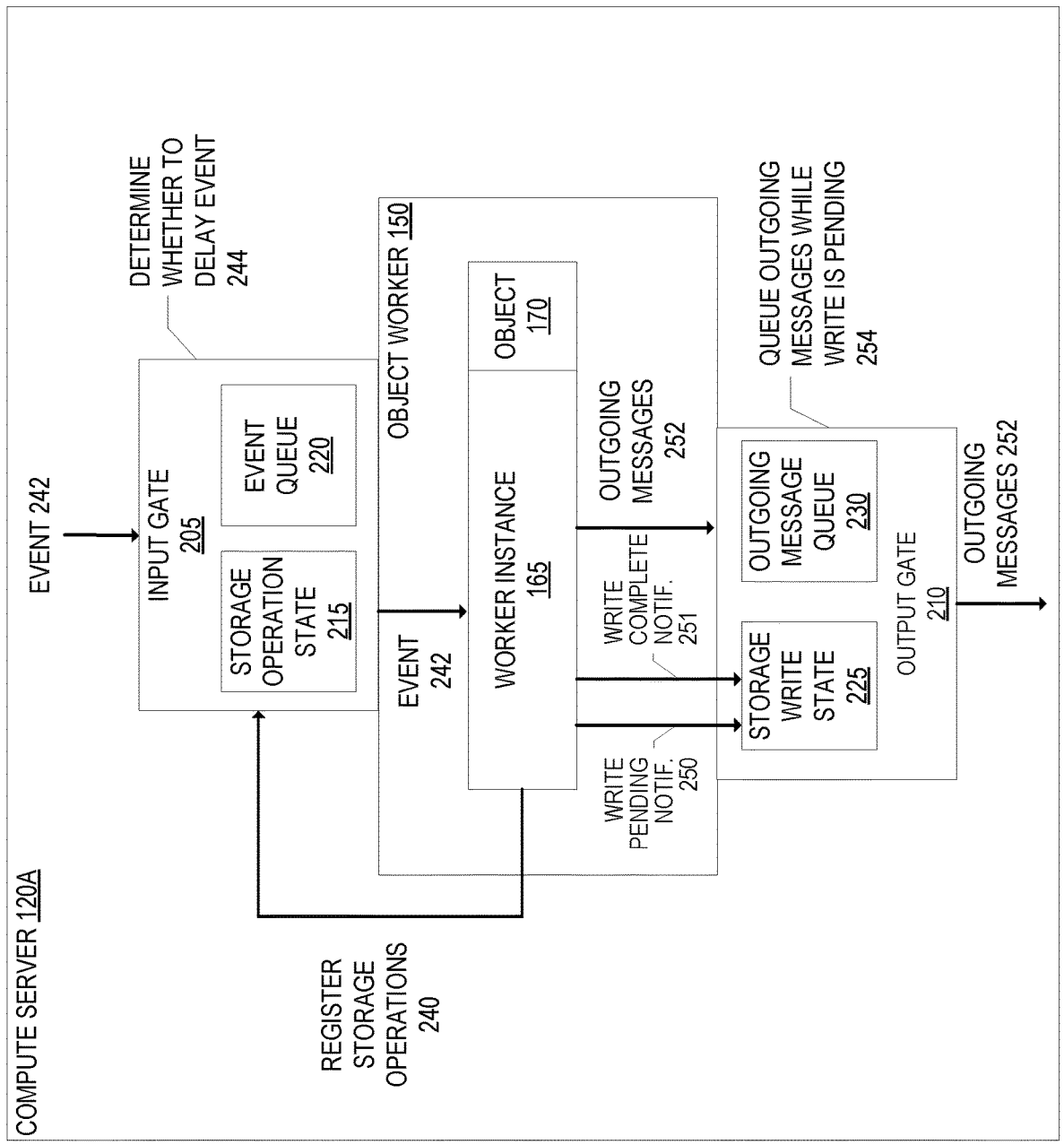
FIG. 2 illustrates a system for concurrency control in an asynchronous event-loop based program environment according to an embodiment.

FIG. 2 illustrates a system for concurrency control in an asynchronous event-loop based program environment according to an embodiment. FIG. 2 shows an example of the system where the program is an object worker 150. However, the program could be any type of program implemented with an asynchronous event-loop. The object worker 150 includes an object worker script instance ("worker instance") 165 that is an instantiated object worker script and the object 170. The object 170 is private and persistent data that only the worker instance 165 can read and/or modify and which no other object worker can directly access. Thus, the worker instance 165 controls reading and/or writing to the object 170. Other entities that wish to interact with the data send messages to the object worker that owns the data. The object 170 may be persistently located in storage (e.g., object storage) remote to the compute server 120A.

The object worker 150 is associated with the input gate 205 and the output gate 210. The input gate 205 is a piece of code that controls the flow of events into a program, such as the object worker 150. The input gate 205 may control input events so that an asynchronous storage operation can be performed without inadvertently allowing a concurrent operation on the single-threaded event loop to run in the meantime that may change the program state in unexpected ways. The input gate is different from a traditional file lock. For example, the input gate does not enforce mutual-exclusive access to a resource like a file lock would. An input event may be an incoming request (e.g., an HTTP/S request), a response (e.g., an incoming HTTP/S response received from a previous outgoing request), an internal event such as a scheduled job, a timer event (e.g., a JavaScript timer event such as setTimeout( ) or setInterval( ), a cache API operation event, a key value store read/write event, a TCP I/O event, or other network event, a keyboard input event, a mouse input event, etc. For instance, the event 242 is received at the input gate 205. To control events into the object worker 150, the input gate 205 determines whether to delay the delivery of events at operation 244. For instance, the input gate 205 may prevent the delivery of events to the worker instance 165 when the worker instance 165 is executing a storage operation, except for storage completion events. Any other event is deferred until the worker instance 165 is no longer executing code and is not waiting for any storage operation to complete. The storage completion events do not block each other. Thus, the object worker may execute multiple storage operations executing concurrently.

In an embodiment, each storage operation of the code executed by the worker instance 165 is registered with the input gate 205. Thus, the storage operation(s) to be initiated by the worker instance 165 are registered with the input gate 205 at operation 240. The input gate 205 is notified when the storage operations are complete. The input gate 205 tracks all pending storage operations in the storage operation state 215. If there is a pending storage operation as indicated in the storage operation state 215, the input gate 205 delays sending the event to the worker instance 165. For instance, the input gate 205 queues the event in the event queue 220. Thus, the input gate 205 tracks the pending storage operations and events that are waiting to be delivered to the object worker 150. When a storage operation resolves, the event(s) that are queued (if any) associated with that storage operation are delivered to the object worker 150.

In an embodiment, the input gate 205 is notified of each storage operation completion. For instance, each storage operation may hold a reference to a lock object. While a lock exists, the input gate 205 does not deliver events to the object worker (e.g., requests, responses, etc.). When the storage operation completes, it stops referencing the lock object. When the lock object's last reference is destroyed, the input gate 205 is notified.

Thus, the input gate 205 can control race conditions. As previously described, it is possible, even with single-threaded programs, to have certain race conditions. FIG. 3 illustrates a race condition that can be prevented with the input gate 205. The code in FIG. 3 shows two requests that may be received at approximately the same time by an object worker (before the use of the input gate 205). If each request calls the function 'getUniqueNumber( )', then the two calls may become interleaved. Each time one of the requests performs an 'await', execution may switch to the other call. An example of this is shown in FIG. 3. At a time T1, request 1 begins executing the getUniqueNumber( ) function, and before it is finished, at a time T3, request 2 begins executing the GetUniqueNumber( ) function. As shown in FIG. 3, the call for request 1 calls 'get("counter")' at time T2 and the call for request 2 calls 'get("counter")' at time T3 before either of them calls 'put("counter", val+1)'. This means that both calls return the same value. However, use of the input gate can prevent concurrency for storage operations.

As described above, while a storage operation is executing, no events are delivered to the object worker except for storage completion events. Any other event is deferred until such a time as the object worker is no longer executing code and is no longer waiting for any storage operations. An example of this is shown in FIG. 4. The functions in FIG. 3 are the same as in FIG. 3. As shown in FIG. 4, at a time T3, the request 2 is received but delivery of the request is blocked because request 1 is waiting for storage. When the 'get("counter")' returns for request 1, the 'put("counter", val+1)' is called. The delivery of request 2 continues to be blocked because request 1 continues to wait for a storage operation (in this case, a "put" storage operation). The result is that these two calls return unique numbers as expected.

The input gate does not preclude making multiple concurrent requests to storage. For instance, the following piece of code has a 'get( )' and 'put( )' storage operation executing concurrently.

```
let promise1 = this.storage.get("foo");
let promise2 = this.storage.put("bar", 123);
await promise1;
frob( );
await promise2;
```

The 'get( )' and 'put( )' storage operations execute concurrently. Also, the call to 'frob( )' may execute before the 'put( )' has completed, but strictly after the 'get( )' completes because that is awaited that promise. However, no other event, such as receiving a new request, can happen in the meantime.

The input gate protects not just against concurrent incoming requests. For instance, the input gate protects against concurrent responses to outgoing requests. For example, the following piece of code launches two 'fetch( )' calls concurrently. After each returns, getUniqueNumber is invoked.

```
async function task1( ) {
    await fetch("https://example.com/api1");
    return await this.getUniqueNumber( );
}
async function task2( ) {
    await fetch("https://example.com/api2");
    return await this.getUniqueNumber( );
}
let promise1 = task1( );
let promise2 = task2( );
let val1 = await promise1;
let val2 = await promise2;
```

These two 'fetch( )' calls do not interfere with each other. The completion of a 'fetch( )' is an event subject to the control of the input gate. When the first of the two fetches returns, the function 'getUniqueNumber( )' is called which performs two storage operations. If the second 'fetch( )' also returns while these storage operations are outstanding, the return of the second 'fetch( )' will be deferred until after these storage operations are performed.

Figure 5:
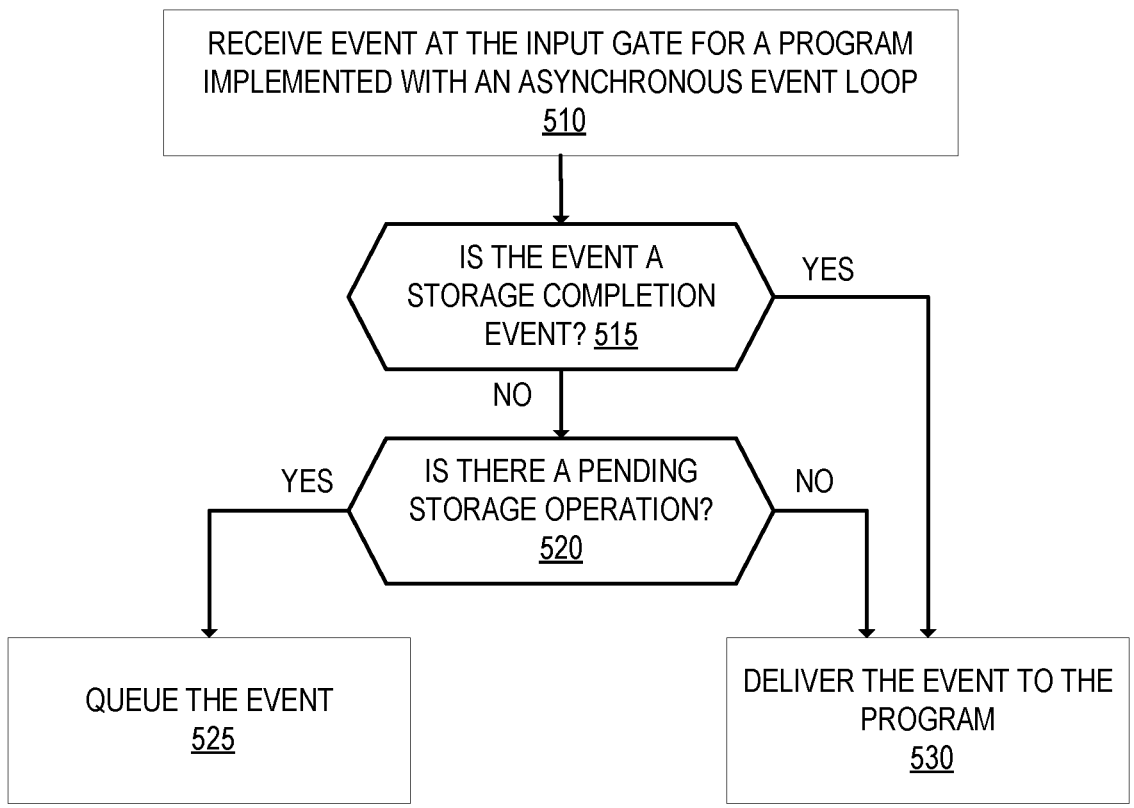
FIG. 5 is a flow diagram that illustrates exemplary operations for controlling the flow of events into a program according to an embodiment.
Figure 6:
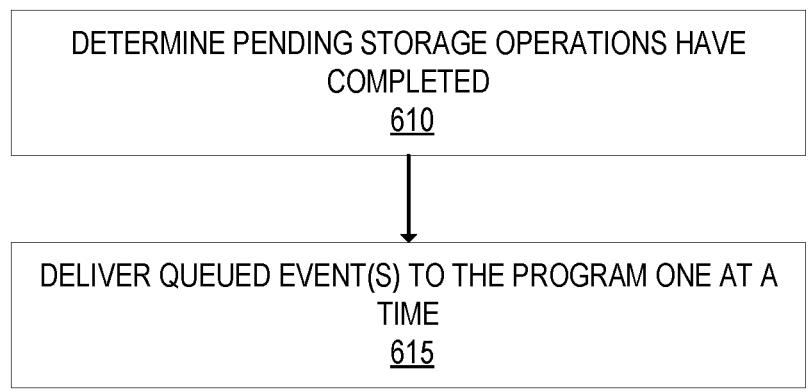
FIG. 6 is a flow diagram that illustrates exemplary operations for controlling the flow of events into a program according to an embodiment.

FIGS. 5 and 6 are flow diagrams that illustrate exemplary operations for controlling the flow of events into a program according to an embodiment. The operations of FIGS. 5 and 6 are described with reference to the exemplary embodiment of FIG. 2. However, the operations of FIGS. 5 and 6 can be performed by different embodiments than that of FIG. 2, and the exemplary embodiment of FIG. 2 can perform different operations than that of FIGS. 5 and 6.

At operation 510, the input gate 205 receives an event for a program that is implemented with an asynchronous event loop, such as the object worker 150. The event may be an HTTP/S request originating from a client or another program, an incoming HTTP/S response received from a previous outgoing request, or an internal event triggered by an internal operation of the compute server. Next, at operation 515, the input gate 205 determines whether the event is a storage completion event. If the event is a storage completion event, then flow moves to operation 530 where the input gate 205 delivers the event to the program. If the event is not a storage completion event, then flow moves to operation 520.

At operation 520, the input gate 205 determines whether there is a pending storage operation. For instance, the input gate 205 accesses the storage operation state 215 to determine whether there is a pending storage operation. In an embodiment, each storage operation of the program is registered with the input gate 205. If there is a pending storage operation, then flow moves to operation 525 where the event is queued in the event queue 220. If there is not a pending storage operation, then flow moves to operation 530 where the input gate 205 delivers the event to the program for processing.

The pending storage operations typically complete without error. At operation 610, the input gate 205 determines that the pending storage operations have completed. In an embodiment, the input gate 205 is notified of each storage operation completion. For instance, each storage operation may hold a reference to a lock object. While a lock exists, the input gate 205 does not deliver events to the program (e.g., requests, responses, etc.). When the storage operation completes, it stops referencing the lock object. When the lock object's last reference is destroyed, the input gate 205 is notified.

Next, at operation 615, the input gate 205 delivers the queued event(s) to the program one at a time. By way of example, if the first event that is released from the queue begins a new storage operation, the input gate 205 will prevent any of the other events that were on the queue from being dequeued until that storage operation has completed.

Although the input gate 205 was described with respect to storage operations, the input gate can be used to make any asynchronous operation appear as if it were a synchronous operation from the perspective of the program whose events are controlled by the input gate. Such asynchronous operation may include an outgoing fetch, an outbound network request, writing data to disk, etc.

Referring back to FIG. 2, the output gate 210 is a piece of code that controls the flow of messages (e.g., outgoing messages 252) out of the program such as the object worker 150. The output gate 210 is either part of the object worker 150 or is associated with the object worker 150 through which all outgoing messages must pass. An outgoing message may be any output including an HTTP/S request, an HTTP/S response, audio, video, etc. The outgoing message is destined to a destination external to the object worker 150. The output gate 210 defers the transmission of any new outgoing network messages until a pending storage write operation has completed except for outgoing network messages that are storage write operations. If the write fails, the outgoing network messages are discarded and replaced with errors and the object worker 150 is shut down and restarted. This allows the object worker 150 to continue executing concurrently with a storage write without running the risk of data loss after confirmation (by preventing other parties from being falsely informed that the data was stored). To the object worker 150, it appears as if the write operation finishes relatively instantly even though the actual write operation may not be completed (or even complete) and the object worker can continue to execute code. However, outgoing network messages are prevented from being sent until the write operation is complete. Thus, the object worker can assume the storage write operation succeeded and continue executing the code. If the storage operation fails, then no outgoing message is delivered and an error message is in place. Thus, in the rare event that a write operation fails, a premature confirmation of a successful write operation is not received by remote parties. This means that although the write is assumed to be confirmed, no other entity will receive that confirmation until the write is confirmed. In the meantime, the object worker can execute other code concurrently that it would otherwise have had to wait to run for the confirmation that the storage write completed. Thus, the output gate allows the application to continue execution in parallel with the write being synched to disk without the risk of prematurely confirming a failed write to remote parties.

The output gate 210 is notified of pending write operations 250 and is notified of completed write operations 251. For instance, the write operation may provide a promise that will resolve when the storage operation is complete. The output gate 210 tracks the state of the storage writes. In an embodiment, the worker instance 165 notifies the output gate 210 of each pending write operation. In another embodiment, the worker instance 165 batches a set of two or more pending write operations and notifies the output gate of the batch of writes. The output gate 210 queues outgoing messages 254 in the outgoing message queue 230 while a write operation is pending as indicated in the storage write state 225. When the write operation has completed, then the queued message can be sent.

The output gate 210 applies to outgoing requests that include responses (e.g., HTTP/S responses sent to a client) and/or outgoing requests (e.g., using a 'fetch( )' call). These outgoing requests are delayed from being sent until all writes are confirmed.

In an embodiment, if a new write operation is received after an outgoing message is queued, the existing queued message(s) do not need to wait for the new write operation to complete before being transmitted. To say it another way, an outgoing message that is queued does not need to wait for any new write operations to complete. However, any new outgoing message that is received after a write operation is pending will be queued.

In an embodiment, an in-memory caching layer is used. The in-memory caching layer may cache data directly in memory in the process where the object worker runs. When a read operation requests a key that is in the cache, the operation returns the value from the cache. The value may be returned without context-switching out of the thread and isolate where the object is hosted. If the key is not in the cache, then a storage request is needed. A storage operation writes to the in-memory caching layer. The output control described herein prevents the premature confirmation of writes to any external entity. Write operations may be coalesced (even if they are 'await' ed) such that the output control waits only for O(1) network round trips of latency, not O(n).

Figure 7:
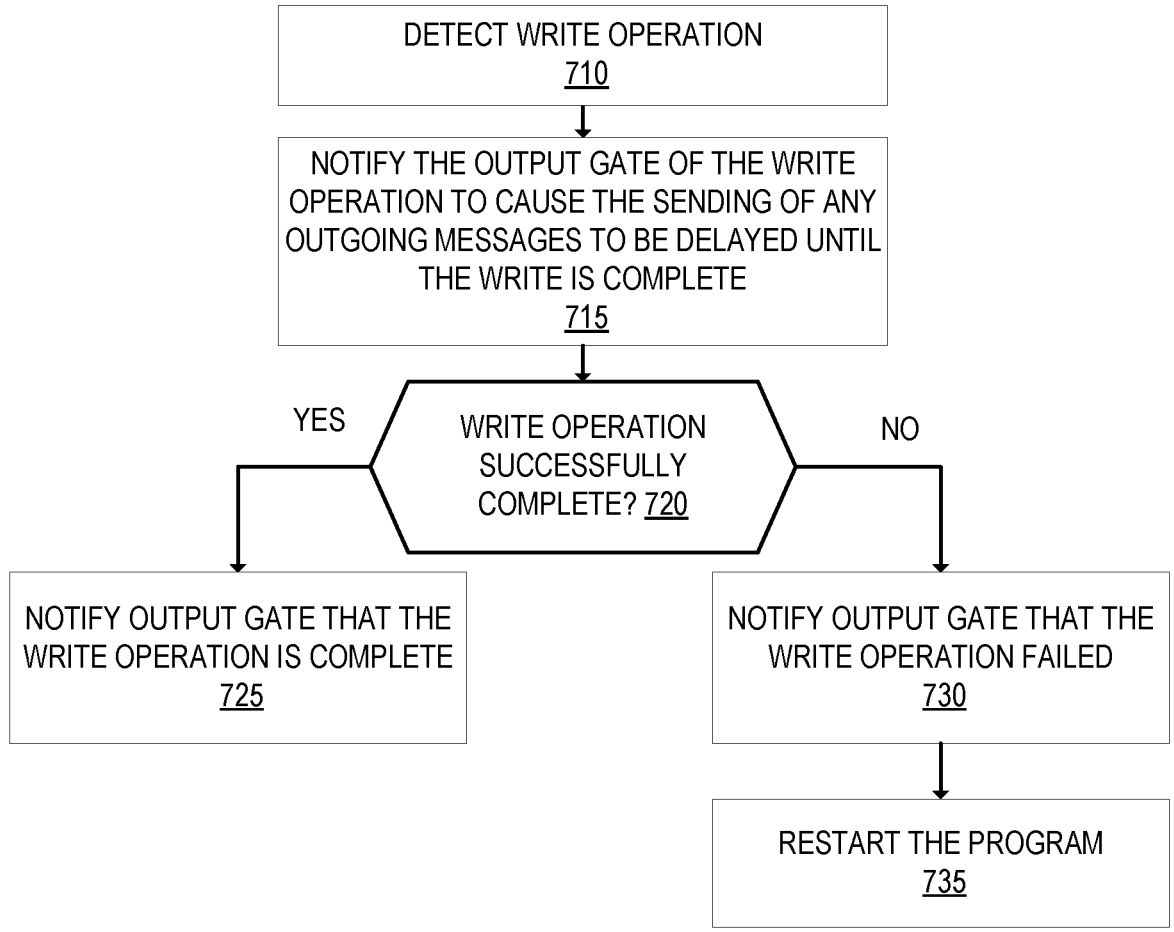
FIG. 7 is a flow diagram that illustrates exemplary operations for controlling the flow of messages out of a program according to an embodiment.
Figure 8:
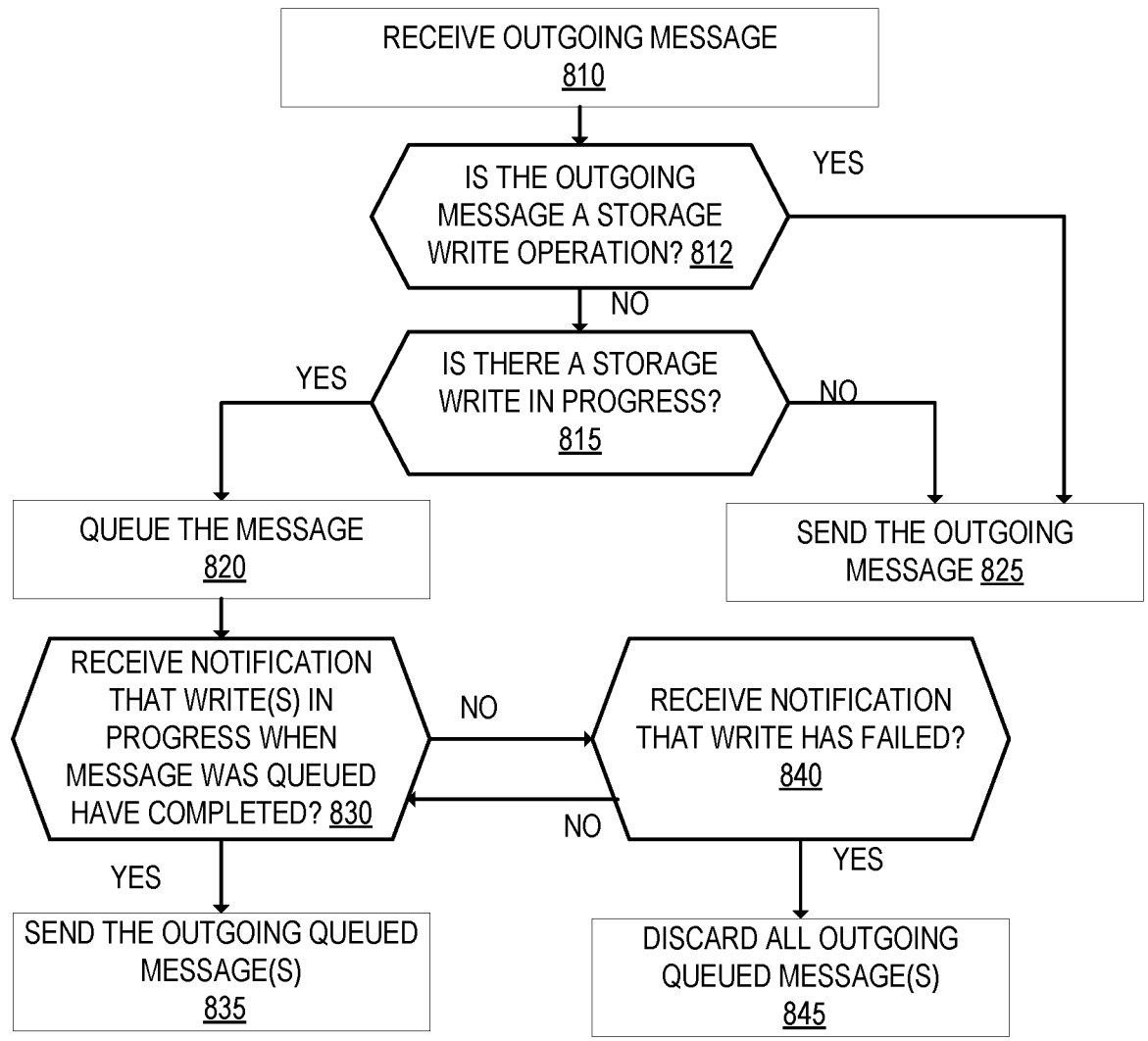
FIG. 8 is a flow diagram that illustrates exemplary operations for controlling the flow of messages out of a program according to an embodiment.

FIGS. 7 and 8 are flow diagrams that illustrate exemplary operations for controlling the flow of messages out of a program according to an embodiment. The operations of FIGS. 7 and 8 are described with reference to the exemplary embodiment of FIG. 2. However, the operations of FIGS. 7 and 8 can be performed by different embodiments than that of FIG. 2, and the exemplary embodiment of FIG. 2 can perform different operations than that of FIGS. 7 and 8.

At operation 710, the program detects a write operation. The write operation will cause the output gate 210 to lock any new outgoing messages until the write operation successfully completes. Thus, at operation 715, the program notifies the output gate 210 of the pending write operation. The notification of the pending write operation causes the output gate 210 to delay the sending of any outgoing message received while the write operation is pending.

At operation 720, the program determines whether the write operation successfully completes. Most write operations successfully complete. If the write operation successfully completes, then operation 725 is performed where the program notifies the output gate 210 that the write operation is complete. In the rare event that the write operation does not complete successfully, then operation 730 is performed where the program notifies the output gate 210 that the write operation has failed. Then, at operation 735, the program is restarted.

At operation 810, the output gate 210 receives an outgoing message from the program. The outgoing message can be an outgoing request (e.g., using a 'fetch( )' call) or a response that is for a client. Next, at operation 812, the output gate 210 determines whether the outgoing message is a storage write operation. If the message is a storage write operation, then flow moves to operation 825 where the outgoing message is transmitted. If the outgoing message is not a storage write operation, then flow moves to operation 815.

At operation 815, the output gate 210 determines whether there is a storage write in progress. The output gate 210 may access the storage write state 225 to determine whether there is a storage write in progress. For instance, the output gate 210 may receive a notification from the worker instance 165 regarding a pending write operation that is tracked in the storage write state 225. If there is not a pending write operation in progress, then flow moves to operation 825 and the outgoing message is transmitted. If there is a pending write operation in progress, then flow moves to operation 820.

At operation 820, the output gate 210 queues the outgoing message in the outgoing message queue 230. Next, at operation 830, the output gate 210 determines whether it has received a notification that write(s) in progress when the outgoing message was queued have completed. For instance, the output gate 210 may receive a notification from the program regarding the completion of a pending write operation that is tracked in the storage write state 225. If the write(s) in progress when the outgoing message was queued have completed, then flow moves to operation 835 where those outgoing queued message(s) are sent. If those write(s) in progress have not completed, then flow moves to operation 840 where the output gate 210 determines whether it has received a notification that one of those write(s) has failed. If it has, then flow moves to operation 845 where all outgoing queued message(s) are discarded. If it has not, then flow moves back to operation 830.

In an embodiment, the code may be written to bypass the controlling of the events with specific syntax that indicates that the controlling of events will not occur.

Figure 9:
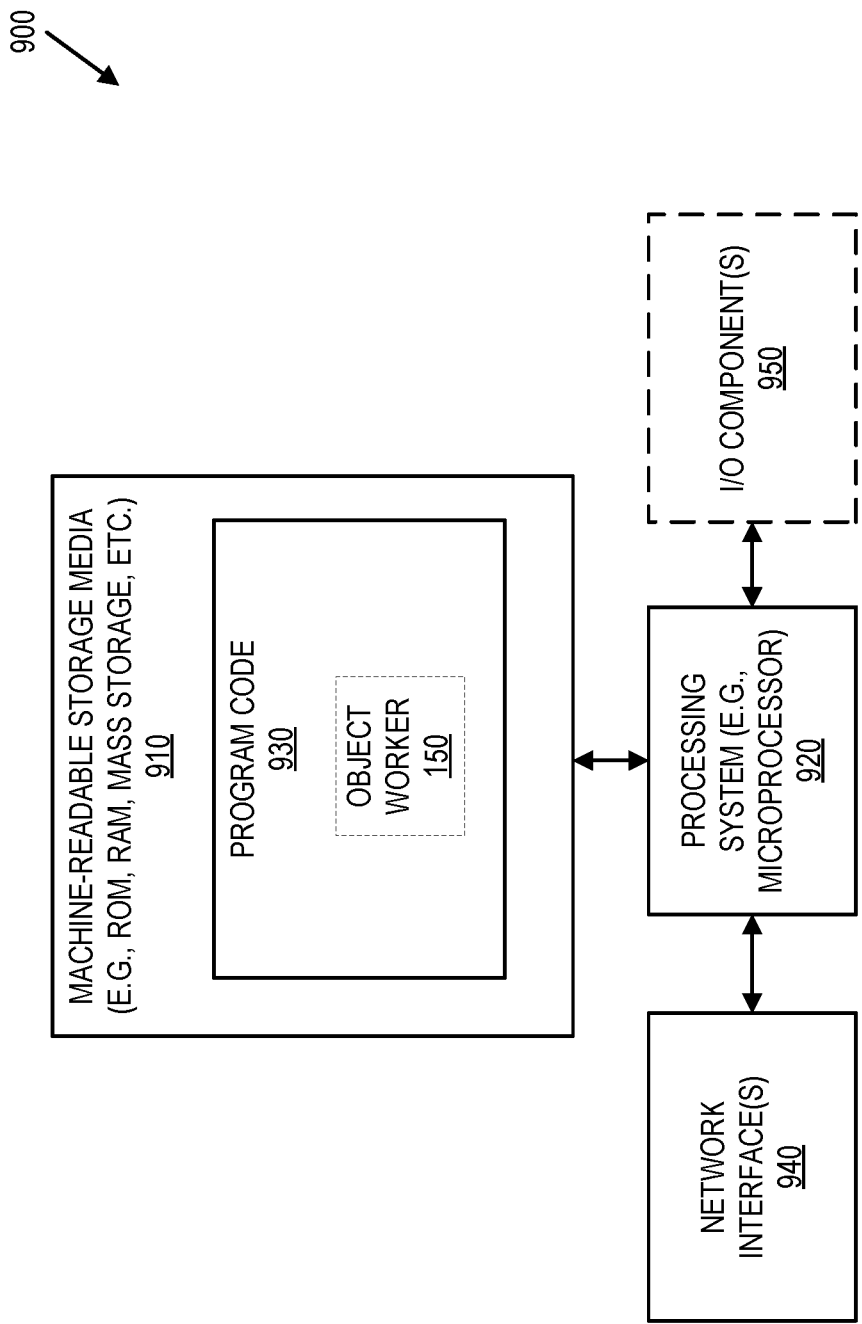
FIG. 9 is a block diagram illustrating a data processing system that can be used in an embodiment.

FIG. 9 illustrates a block diagram for an exemplary data processing system 900 that may be used in some embodiments. One or more such data processing systems 900 may be utilized to implement the embodiments and operations described with respect to the compute servers and/or client devices. Data processing system 900 includes a processing system 920 (e.g., one or more processors and connected system components such as multiple connected chips).

The data processing system 900 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 910 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 920. For example, the depicted machine-readable storage media 910 may store program code 930 that, when executed by the processor(s) 920, causes the data processing system 900 to execute the object worker 150, and/or any of the operations described herein.

The data processing system 900 also includes one or more network interfaces 940 (e.g., a wired and/or wireless interfaces) that allows the data processing system 900 to transmit data and receive data from other computing devices, typically across one or more networks (e.g., Local Area Networks (LANs), the Internet, etc.). The data processing system 900 may also include one or more input or output ("I/O") components 950 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 900, and, in certain embodiments, fewer components than that shown in One or more buses may be used to interconnect the various components shown in FIG. 9.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
receiving, at a first piece of code that controls events into a program, an event that is for the program, wherein the program is implemented with an asynchronous event-loop;
determining that there is a pending storage operation triggered by the program, and responsive to this determination, preventing the event from being delivered to the program for execution until the pending storage operation has successfully completed;
determining that the pending storage operation has successfully completed, and responsive to this determination, delivering the event to the program for execution;
receiving, at the program from the first piece of code, the event; and
processing the event at the program.

2. The method of claim 1, further comprising:
receiving, at a second piece of code that controls outgoing messages from the program, a notification from the program that a write operation is pending;
receiving, from the program at the second piece of code, an outgoing message that is destined to a destination external to the program, wherein at a time of receiving the outgoing message, the second piece of code has not received a notification from the program that the write operation has successfully completed;
preventing the outgoing message from being transmitted; and
subsequent to the preventing the outgoing message from being transmitted, receiving the notification from the program that the write operation has successfully completed, and transmitting the outgoing message to the destination external to the program.

3. The method of claim 2, further comprising:
receiving, at the second piece of code, a second outgoing message that is destined to a second destination external to the program;
determining that the second outgoing message is a storage write operation, and responsive to this determination, transmitting the second outgoing message to the second destination external to the program regardless of whether the write operation is pending.

4. The method of claim 1, wherein the program is a script, and wherein the event is a Hypertext Transfer Protocol (HTTP) request.

5. The method of claim 1, wherein the event is a Hypertext Transfer Protocol (HTTP) response.

6. The method of claim 1, wherein the event is an internal event triggered by a first one of a plurality of compute servers.

7. The method of claim 1, further comprising:
receiving, at the first piece of code, a second event for the program; and
determining that the second event is a storage completion event, and responsive to this determination, delivering the second event to the program for execution.

8. A server, comprising:
a processor; and
a non-transitory machine-readable storage medium coupled to the processor, wherein the non-transitory machine-readable storage medium stores instructions that, when executed by the processor, executes software code including:
a program that is implemented with an asynchronous event-loop; and
a first piece of code that controls events into the program, wherein the first piece of code prevents events from being delivered to the program while a storage operation is executing except for storage completion events, and wherein those events are prevented from being delivered to the program until the storage operation completes and the program is not executing code.

9. The server of claim 8, wherein the software code further includes:
a second piece of code that controls outgoing messages from the program,
wherein the second piece of code defers transmission of any outgoing network messages received from the program while a storage write operation is pending until that storage write operation has completed except for outgoing network messages that are themselves storage write operations.

10. The server of claim 9, wherein the software code further includes:
an in-memory caching layer, wherein the program writes to the in-memory caching layer, and wherein the second piece of code prevents premature confirmation of those writes to external parties until the writes are confirmed complete.

11. The server of claim 8, wherein the events that are prevented from being delivered to the program while a storage operation is executing include a Hypertext Transfer Protocol (HTTP) request event, an HTTP response event, and an internal event triggered by the server.

12. The server of claim 8, wherein each storage operation called by the program is registered with the first piece of code, and wherein the first piece of code is notified of completion of storage operations.

13. The server of claim 8, wherein the server is one of a plurality of compute servers of a distributed cloud computing network, and wherein the program includes a single instantiation of a third piece of code that solely controls reading and writing access to an object that is handled by the program.

14. A non-transitory machine-readable storage medium that provides instructions that, when executed by a processor, causes said processor to perform operations comprising:
receiving, at a first piece of code that controls events into a program, an event that is for the program, wherein the program is implemented with an asynchronous event-loop;
determining that there is a pending storage operation triggered by the program, and responsive to this determination, preventing the event from being delivered to the program for execution until the pending storage operation has successfully completed;
determining that the pending storage operation has successfully completed, and responsive to this determination, delivering the event to the program for execution;
receiving, at the program from the first piece of code, the event; and
processing the event at the program.

15. The non-transitory machine-readable storage medium of claim 14, wherein the operations further comprise:
receiving, at a second piece of code that controls outgoing messages from the program, a notification from the program that a write operation is pending;
receiving, from the program at the second piece of code, an outgoing message that is destined to a destination external to the program, wherein at a time of receiving the outgoing message, the second piece of code has not received a notification from the program that the write operation has successfully completed;
preventing the outgoing message from being transmitted; and
subsequent to the preventing the outgoing message from being transmitted, receiving the notification from the program that the write operation has successfully completed, and transmitting the outgoing message to the destination external to the program.

16. The non-transitory machine-readable storage medium of claim 15, wherein the operations further comprise:
receiving, at the second piece of code, a second outgoing message that is destined to a second destination external to the program;
determining that the second outgoing message is a storage write operation, and responsive to this determination, transmitting the second outgoing message to the second destination external to the program regardless of whether the write operation is pending.

17. The non-transitory machine-readable storage medium of claim 14, wherein the program is a script, and wherein the event is a Hypertext Transfer Protocol (HTTP) request.

18. The non-transitory machine-readable storage medium of claim 14, wherein the event is a Hypertext Transfer Protocol (HTTP) response.

19. The non-transitory machine-readable storage medium of claim 14, wherein the event is an internal event triggered by a first one of a plurality of compute servers.

20. The non-transitory machine-readable storage medium of claim 14, wherein the operations further comprise:
receiving, at the first piece of code, a second event for the program; and
determining that the second event is a storage completion event, and responsive to this determination, delivering the second event to the program for execution.

\* \* \* \* \*